Jan. 6, 1942.  C. S. HAZARD  2,269,021
PARKING METER
Filed May 29, 1937  3 Sheets-Sheet 2

INVENTOR
Charles S. Hazard
BY
his ATTORNEYS

Jan. 6, 1942.  C. S. HAZARD  2,269,021
PARKING METER
Filed May 29, 1937  3 Sheets-Sheet 3

INVENTOR
Charles S. Hazard
BY
ATTORNEYS

Patented Jan. 6, 1942

2,269,021

UNITED STATES PATENT OFFICE 2,269,021

PARKING METER

Charles S. Hazard, New York, N. Y., assignor, by mesne assignments, to Miller Meters, Incorporated, Chicago, Ill., a corporation of Illinois Application May 29, 1937, Serial No. 145,415

9 Claims. (Cl. 161—15)

This invention relates to timing devices such as parking meters and the like and particularly to constructions adapted to be actuated at any time to initiate a timing operation of predetermined duration.

Parking meters as heretofore constructed have included timing elements in the form of spring or electrically driven motors, or have included escapement mechanism driven by a weight, but such timing devices have not been so constructed and protected as to avoid rusting, deterioration and uncertainties in operation, arising from the action of moisture, the fumes and smoke of cities and extreme cold which may cause the formation of ice in and about the mechanism. This is particularly objectionable in a parking meter that is exposed to rain, snow and even flood and therefore some cities require that parking meters be subjected to a submersion test before being approved, in order to ensure reliable operation of the mechanism under all conditions of use.

In some instances parking meters also are found to be objectionable because the amount of unexpired time remaining from a previous parking period may be observed readily and persons therefore may drive about slowly looking for a parking space which may be occupied for some time without cost, thus aggravating the control and movement of traffic.

In accordance with the present invention, these objections to constructions of the prior art are overcome by providing timing means enclosed within a housing which may be sealed to exclude moisture and to prevent rust, deterioration or the formation of ice upon the elements of the timing means so that the device will operate accurately and dependably under all weather conditions and even after being subjected to immersion. The invention also includes means for preventing observation of the amount of unexpired time remaining in any parking period.

The mechanism provided for attaining the advantages of the present invention may take various forms, but as hereinafter described, and as shown in the accompanying figures of the drawings, the device is shown as including timing means in the form of a gravity actuated escapement mechanism enclosed within a watertight casing and adapted to be actuated to initiate a new timing operation of predetermined duration by rotation of the casing. In the device illustrated, the movement of the casing to initiate a new timing operation also serves to actuate means for concealing a time indicator during the permissible parking period.

One of the objects of the present invention is to provide a parking meter with a novel type of timing means capable of being reset at any time to initiate a new timing operation.

Another object of the invention is to provide a parking meter with novel timing means which is uninfluenced by weather conditions to which the parking meter may be subjected and which will withstand submersion in water as in floods.

A further object of the invention is to provide a parking meter with a novel arrangement of means for preventing observation of the length of time yet remaining in a prescribed parking period and for giving a warning signal when the period has elapsed.

These and other objects and features of the invention will appear from the following description thereof, in which reference is made to the accompanying figures of the drawings illustrating a typical embodiment of the invention.

In the drawings:

Fig. 4 is a detail view of certain alternative elements that may be embodied in the timing means of Fig. 2.

Figure 1:
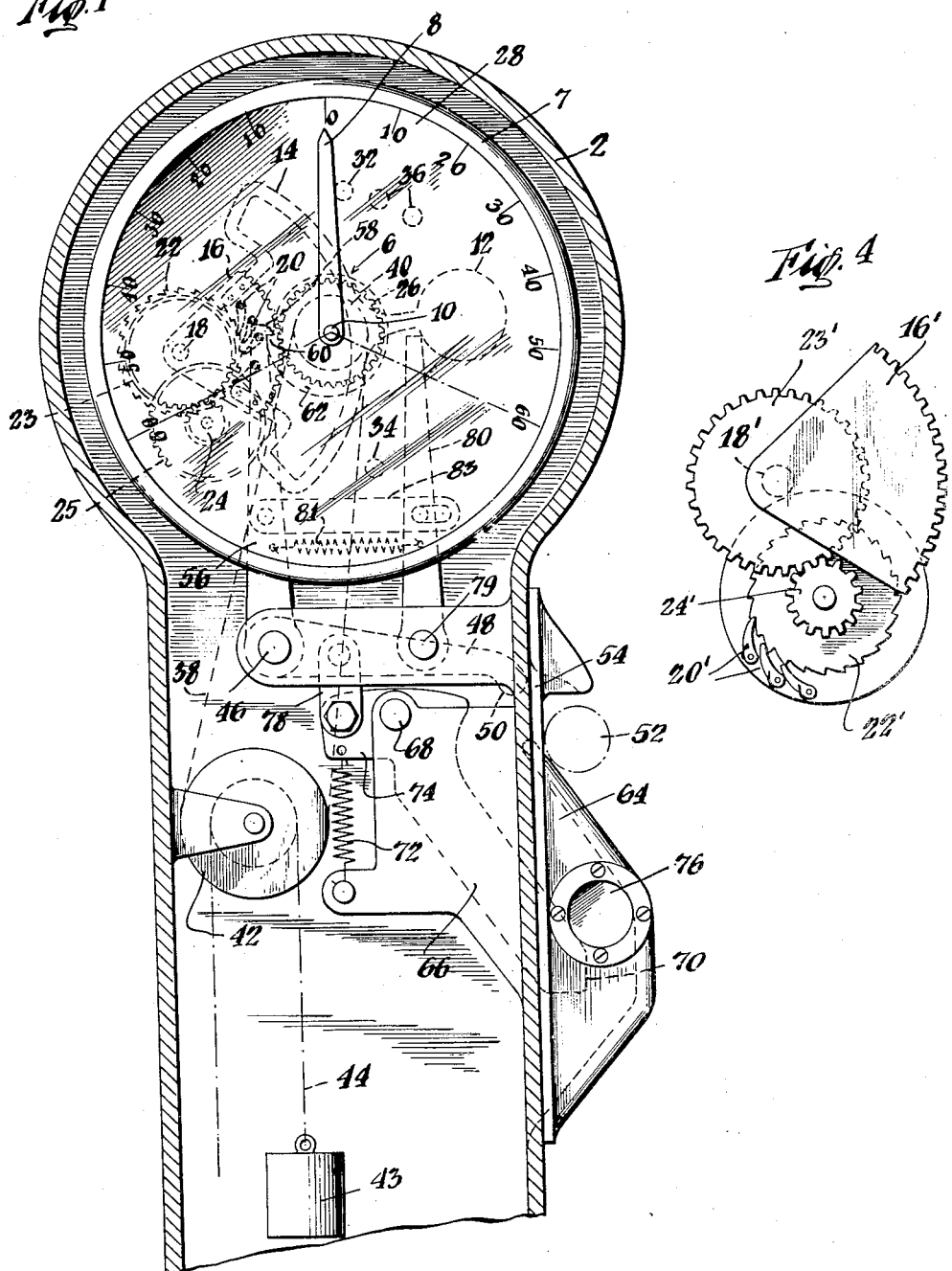
Fig. 1 is a vertical sectional view of the upper portion of one form of parking meter embodying the present invention, the section being taken through the outer housing with parts removed to show the operating mechanism and chamber for the timing means in elevation.
Figure 6:
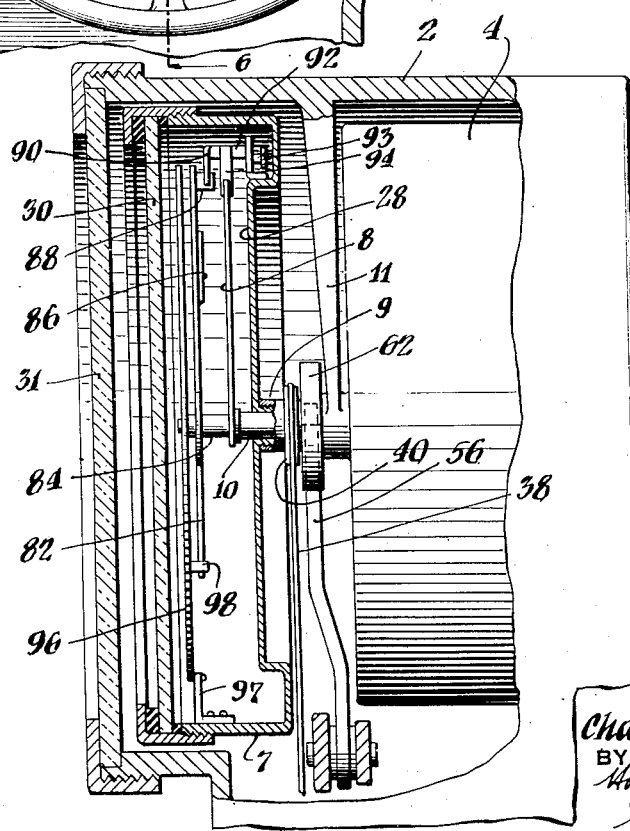
Fig. 6 is a vertical partial sectional view of the construction illustrated in Fig. 5 taken on the line 6—6 thereof.

In that form of the invention chosen for purposes of illustration in Figs. 1 and 6 of the drawings, the device embodies a housing 2 within which is located a hermetically sealed chamber including a cylindrical casing 4 enclosing timing means 6, a shell 7 enclosing an indicator hand 8 actuated by the timing means, and a tubular neck 9 threadedly connecting the casing 4 and shell 7, and through which passes a shaft 10 by which the indicator hand 8 is carried. The casing 4, shell 7 and connecting neck 9 together constitute a chamber within which the timing elements are enclosed and completely sealed to protect them from external influences.

The chamber is suitably mounted for rotation on a support 11 within the housing 2 and when rotated through a complete revolution serves to energize the timing means and to reset the indicator hand to a predetermined position to initiate a new timing operation.

Figure 2:
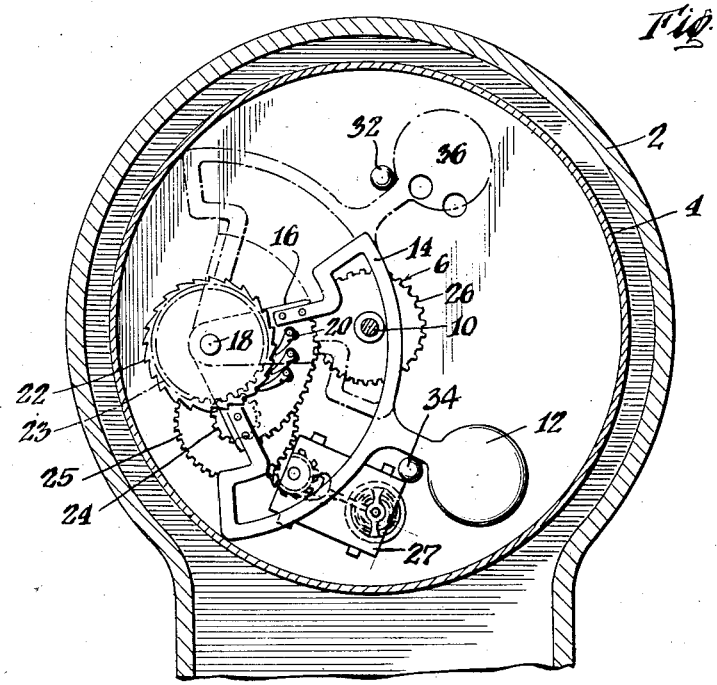
Fig. 2 is a vertical sectional view through the casing for the timing means showing the parts thereof in the position assumed at the end of a timing operation.
Figure 3:
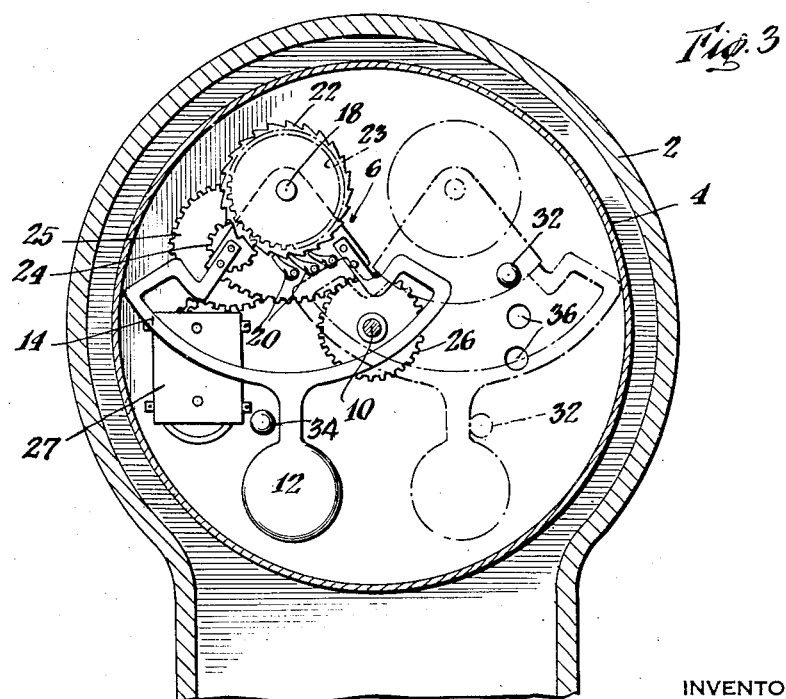
Fig. 3 is a view similar to Fig. 2 with the casing rotated through an arc of approximately 60° in a clockwise or resetting direction.

The timing means illustrated in Figs. 1, 2 and 3 is in the form of a gravity actuated escapement mechanism including a weight 12 carried by a yoke 14 secured to a segmental gear 16. The segmental gear is pivotally movable about a shaft 18 supported by the casing 4 and is provided with one or more spring biased pawls 20 for engaging the teeth of a ratchet wheel 22. The ratchet wheel 22 is secured to a gear 23 which meshes with a gear 24, the latter being secured to a gear 25 which in turn cooperates with the usual escapement-wheel and balance-wheel arrangement 27 of the escapement mechanism to control the movement of the indicator hand under the action of the weight 12. The indicator hand 8 is driven by segmental gear 16 through a gear 26 on shaft 10 and moves at a predetermined rate over a dial 28 on the inner rear wall of the shell 7. The dial and indicator hand are observable from the front of the meter and through the transparent face 30 of the shell 7 and the transparent face 31 of the housing 2.

Stops 32 and 34 are located within the casing 4 to limit the movement of the weight 12 in opposite directions. Stop 32 defines an initial or raised position indicated in dotted lines in Fig. 2, to which the weight 12 is moved in starting a timing operation. In moving downward from this position the segmental gear 16 meshing with gear 26 rotates the shaft 10 and moves the indicator hand 8 in a counterclockwise direction away from an initial position indicated by the numeral 60 on the right hand side of the dial as seen in Fig. 1. On continued downward movement of the weight 12, the indicator hand moves toward the numeral zero and thence moves on away from zero to the numeral 60 on the left-hand side of the dial. The stop 34 prevents further movement of the weight 12 so that the indicator hand comes to rest adjacent the numeral 60 on the left-hand side of the dial on completion of the timing operation. The distance through which the indicator hand moves in approaching zero determines the length of time allowed as the parking period, while the distance through which the hand moves away from zero and toward the numeral 60 on the left-hand side of the dial indicates the length of time a vehicle has been parked beyond the allowed period. By adjustment of the stop 32 to any of the positions 36, the initial position of weight 12 and the duration of the allowed parking period can be varied to meet the conditions presented in different parking areas.

In initiating a new timing operation and resetting the indicator hand 8 to the right-hand numeral 60, or to any other point determined by the location of the stop 32, the chamber including the casing 4 for the timing means and the shell 7 for the indicator hand are rotated in a clockwise direction as seen in Figs. 1, 2 and 3. The weight 12, which will be in engagement with the stop 34, as shown in full lines in Fig. 2, if the previous timing operation has been completed, will move downward about the axis of the casing 4 as the casing 4 is rotated and the shaft 18 about which the weight 12 is pivotally movable will move upward. When the weight 12 reaches a position vertically beneath the shaft 18, as shown in full lines in Fig. 3, it will remain suspended vertically while the casing continues to rotate and the shaft 18 and ratchet wheel 22 are carried thereby. As the ratchet wheel moves with the casing from the full line to the dotted line position of Fig. 3, it rotates in a clockwise direction relative to the gear segment 16 to which weight 12 is secured and therefore pawls 20 pass freely over the ratchet teeth to assume a new position for driving the escapement mechanism on raising the weight to its initial or starting position. Further rotation of the casing moves the stop 32 into engagement with the weight 12 and raises it through the final 180° or more of movement until it reaches the starting position indicated in dotted lines in Fig. 2. In this way a new timing operation is initiated every time the casing 4 is rotated. Furthermore, the timing operation may be initiated at any time by rotating the casing and need not await the completion of a previous timing operation.

In the embodiment of the invention shown in Figs. 1, 2 and 3, a series of pawls 20 is provided for engaging the teeth of the ratchet wheel 22. These pawls are so positioned that they will successively engage the teeth on the ratchet on relative movement of the ratchet and pawls. This construction serves to insure engagement of one or another of the pawls with the teeth of the ratchet upon minute movement of the segmental gear and the pawls in a clockwise direction, as seen in Figs. 1, 2 and 3, so that lost motion between the segmental gear 16 and the ratchet wheel 22 on resetting the mechanism is substantially eliminated and the positioning of the weight 12 and indicator hand 8 in initiating a new timing operation is rendered accurate and the duration of the timing operation is more uniform.

Fig. 4 illustrates an alternative construction of ratchet and pawl mechanism that may be used in the construction of Figs. 1, 2 and 3 to insure still more accurate positioning of the weight 12 and indicator 8 on resetting the mechanism. In this construction, the pawls 20' engage a ratchet wheel 22' movable with a gear 24' of the escapement mechanism which rotates in response to movement of gear segment 16' through a much larger arc than does the gear 23' on shaft 18'. In this way the movement of segmental gear 16' and of indicator 8 which serves to bring the pawls 20' into engagement with the teeth of ratchet wheel 22' is extremely small so that the resetting of the indicator and the accuracy of the timing operation may be made even more accurately than when using the construction of Figs. 1, 2 and 3.

In order to rotate or move the timing chamber and casing 4 thereof to raise the weight 12 and initiate a timing operation of predetermined duration, the casing 4 may be rotated in a clockwise direction, as seen in Fig. 1. This may be accomplished by any suitable means, such as the power actuated means illustrated, including a belt 38 which passes over a pulley 40 secured to the tubular neck 9 of the timing chamber and driven by a pulley 42 supported within the housing 2 and below the casing 4. The pulley 42 may be driven by any suitable power storage means, such as a weight 43 secured to a cable 44.

Operation of the power storage means to actuate the casing and initiate a new timing operation, may be controlled by suitable coin controlled means such as a bell crank pivoted at 46 and having an arm 48 with a downwardly turned end 50 positioned to be engaged by a coin 52 on insertion thereof through a coin receiving slot 54 in the housing 2. The opposite arm 56 of the bell crank serves as a latching means and is provided with an inturned upper end 58 for engagement with a projection 60 on a single toothed ratchet 62, secured to the tubular neck 9 of the chamber for the timing means.

The coin slot 54 communicates with a coin passage 64 through which a coin on insertion passes downward over a coin retaining member 66 pivoted at 68. The lower end 70 of the coin retaining member is urged outwardly by a spring 72 connected to an extension 74 of the coin retaining member on the opposite side of pivot 68. The member 66 thus serves to retain the coin inserted in position adjacent a sight opening 76 so that it may be readily seen and the use of slugs or improper operating means is discouraged.

The extension 74 of the coin retaining member is connected by a link 78 to the arm 48 of the bell crank so that spring 72 which urges the rearward extension 74 of the coin retaining member downward also serves to urge the end 50 of the arm 48 downward into position to be engaged by a coin inserted in the coin slot, and to urge the latching arm 56 of the bell crank against the ratchet 62 on the neck 9 of the timing chamber.

In operating the mechanism described, a coin 52 is inserted into the coin slot 54 and raises the end 50 of the arm 48 of the bell crank. The latching arm 56 of the bell crank is thereby swung out of engagement with the projection 60 on the single toothed ratchet member 62, whereupon the casing 4 and shell 7 are released for rotation under the action of the power storage means 43. The casing then rotates in a clockwise direction through one complete revolution and is stopped in its original position by the latch arm 56 which again engages the projection 60 on the single toothed ratchet member. This movement of the timing chamber serves to raise weight 12 and reset hand 8 in initiating a new timing operation. As described above, the weight 12, during the initial portion of the resetting movement of the casing 4, moves to the full line position shown in Fig. 3 in which the weight 12 is suspended vertically below the shaft 18. On continued rotation of the casing to the dotted line position of Fig. 3, the ratchet 22 moves with the casing while weight 12 and gear segment 16 remain in their vertical positions so that the spring biased pawls 20 ride over the teeth of the ratchet wheel 22 to a new position. The stop 32 then serves to raise the weight and restore it to its initial position from which it descends under the action of gravity and under control of the escapement mechanism to drive the indicator hand 8 in a counterclockwise direction.

A supplemental latch member 80 similar to that shown and described in the copending application of Harry L. Long, Serial No. 141,491, filed May 8, 1937, is provided for preventing the power storage means from running down in the event the arm 48 of the bell crank is held in raised position by inserting a member into the coin slot. The member 80 is pivoted at 79 and is urged toward the single toothed ratchet member 62 by a spring 81 so as to engage the projection 60 on the ratchet member if the latching arm 56 is held away from the ratchet member. A link 83 connected to latch arm 56 serves to hold and move supplemental latch arm 80 away from the projection 60 when the latch arm 56 is released to engage the single toothed ratchet member.

In the construction illustrated the indicator hand 8 is reset into its initial position at 60 on the right-hand side of dial 28 and will move from its initial position to the position indicated as zero in one hour. The indicator hand then will move on from zero to the position 60 on the left-hand side of the dial in Fig. 1 in another hour. The second stop 34 is positioned to be engaged by the weight 12 at the end of the second hour after initiating a timing operation. The mechanism when so constructed provides for an initial parking period of one hour and an overtime parking period of an additional hour before the timing means ceases to operate. It will be apparent, however, that the distance between the stops 32 and 34 may be varied as desired in order to provide shorter or longer initial parking periods and shorter or longer over-parking indications.

In order to prevent or discourage the tendency of some persons to drive about in search of a parking space which has been vacated while a substantial portion of a previous parking period remains, the device preferably is also provided with means for concealing the indicator hand 8 during the allowed parking period and while the indicator is moving from its initial position to the zero indication. The mechanism preferably is then operated to expose the indicator hand 8 so that the length of time that the vehicle has over-stayed the allowed parking period can be readily observed.

Figure 5:
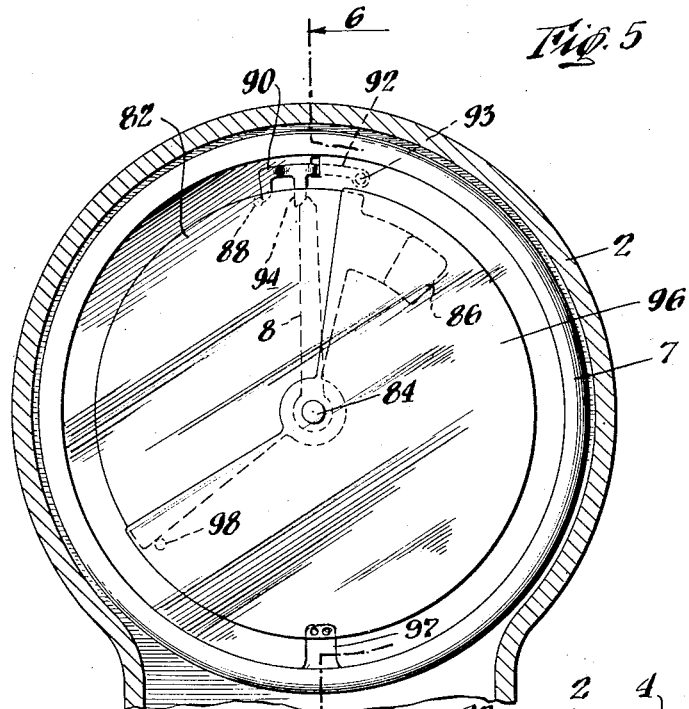
Fig. 5 is a vertical, part sectional and part elevational, view of a head of a parking meter of the type illustrated in Fig. 1 embodying a shutter mechanism for concealing the indicator.

Referring to Figs. 5 and 6 of the drawings, mechanism is illustrated wherein the device is provided with a shutter 82 pivotally mounted on an extension 84 of the shaft 10 within the shell 7 of the timing chamber for rotation about the axis of the shell. A weight 86 attached to the shutter 82 tends to urge the shutter in a clockwise direction, as viewed in Fig. 5, during the allowed parking period, but the shutter is held against such movement by a pin 88 on the shutter mechanism engaging a stop 90 on the end of an arm 92 pivoted at 93 on the dial 28 of the device. A downwardly extending trip 94 is positioned to be engaged by the hand or indicator 8 on movement thereof past the zero indication or past a five-minute indication allowed as a grace period for over-parking of a vehicle. The remainder of the dial may be concealed by a shield 96 fixed to the shell 7 by a bracket 97 so that only that portion of the dial corresponding to the over-parking period can be observed. The shield 96 also functions as an end bearing for the extension 84 of the shaft 10.

With this construction, movement of the indicator 8 past the zero indication causes it to engage the trip 94, to raise the pivoted arm 92 so that the stop 90 will be withdrawn from engagement with the pin 88 and the shutter 82 will be released to move in a clockwise direction under the action of the weight 86. The shutter thus exposes the portion of the indicator corresponding to the over-parking period from zero to 60 on the left-hand side of the dial as seen in Fig. 1.

The indicator continues to move as the weight 12 moves downward, until the weight engages the stop 34 as shown in Fig. 2 and which, as described, is positioned to prevent movement of the indicator beyond the indication 60 on the left-hand side of the dial.

On resetting the mechanism by rotation of the shell 7 with the timing chamber, the weight 86 remains in a lowered position and the hand 8 moves past the trip 94 as the shell is inverted and the trip retracted by gravity. Thereafter a pin 98 on the shield 96 engages the free edge of the shutter and raises the shutter and weight as the shell 7 rotates. Stop 90 and trip 94 then fall into their holding and tripping positions as the casing is righted again. In this way, the shutter is reset on resetting the indicator and initiating a new timing operation and remains in position to conceal the indicator until the indicator against passes the zero indication or that indication adjacent which the trip is located.

In using the mechanism described, the power storage means may be rewound or re-energized at convenient times and preferably is of such capacity that the rewinding may be done at the same time that coins used in operating the device are collected. However, the power storage means may be energized at any time and by any suitable means or the device may be operated manually or otherwise as desired. It will also be evident that the form and construction as well as the arrangement of the elements employed may be varied considerably without departing from the invention. Therefore, it is intended that the form of the invention described above and shown in the drawings is to be considered as illustrative of the invention and is not intended to limit the scope thereof.

I claim:

1. In a submersion proof parking meter adapted to be actuated by a coin, a hermetically sealed chamber, escapement mechanism within said chamber, an indicator controlled by said escapement mechanism, a weight mounted within said chamber for movement relative to said chamber to drive said indicator and escapement mechanism, a ratchet and pawl connection between said weight and escapement mechanism permitting free resetting movement of said weight and controlled movement thereof in a timing operation, means adjustably positioned in and carried by said chamber adapted to engage said weight upon rotation of said chamber to move said weight to a predetermined raised position, power storage means for rotating said chamber and displaceable means for controlling operation of said power storage means.

2. In a parking meter, a timing device including time indicating means movable to indicate lapse of time, means for moving said device to initiate a timing operation, means actuated by said device on movement thereof to initiate a timing operation for concealing said time indicating means and means controlled by said time indicating means and operable at a predetermined time after initiation of a timing operation and prior to the end of a predetermined timing period for actuating said concealing means to expose said time indicating means.

3. In a parking meter, a timing device including means operable to indicate lapse of time, a dial over which said indicating means is adapted to move, said dial being portioned to provide a prescribed parking period and an overtime parking period, means for shielding said dial including a shutter adapted to cover the portion representing over-time parking, and means operable upon the lapse of said prescribed parking period to effect movement of said shutter to expose said over-time parking portion of the dial, said indicating means being thereafter movable across said exposed portion to indicate the lapse of over-time parking.

4. In a parking meter, a timing device including means operable to indicate lapse of time, means for resetting said device to initiate a timing operation, means for shielding at least a portion of said indicating means for a predetermined period of time after the initiation of a timing operation, means for holding said shielding means in shielding position, said indicating means operating after the lapse of said predetermined period of time to cause said holding means to release said shielding means and expose the shielded portion thereof, and said indicating means being operable thereafter to indicate further lapse of time.

5. In a parking meter, an indicator, a dial over which said indicator is adapted to move, said dial being portioned to provide a prescribed parking period and an over-time parking period, means for shielding said dial portions including a shutter movable from a position shielding said over-time parking portion of the dial to a position exposing said portion of the dial, means for holding said shutter in shielding position, said indicator being operable upon expiration of said prescribed period to cause said shutter holding means to release the shutter for movement to dial exposing position, and said indicator being operable thereafter to indicate lapse of over-time parking.

6. A parking meter comprising a casing mounted for rotation, an indicator, timing means mounted in said casing including motivatable means adapted to be reset to an intial driving condition upon rotation of said casing, a dial over which said indicator is adapted to move, said dial being portioned to provide a prescribed parking period and an over-time parking period, means for shielding said dial portions including a shutter movable from a position shielding said over-time parking portion of the dial to a position exposing said portion of the dial, means for holding said shutter in shielding position, said indicator being operable upon expiration of said prescribed parking period to cause said shutter holding means to release the shutter for movement to dial exposing position, said indicator being operable thereafter to indicate lapse of over-time parking and means operable upon rotation of said casing to return said shutter to said shielding position.

7. In a timing device for parking meters and the like, a substantially cylindrical casing mounted for rotation, an escapement mechanism within said casing, an indicator controlled by said escapement mechanism, means for driving said indicator and escapement mechanism, said driving means including a weighted member pivoted on an axis eccentrically located with respect to the axis of said casing for movement between upper and lower positions in said casing and means for rotating said casing to cause said weighted member to be returned to its upper position to initiate a timing operation.

8. In a timing device for parking meters and the like, a casing mounted for rotation, an escapement mechanism within said casing, an indicator controlled by said escapement mechanism, means for driving said indicator and escapment mechanism, said driving means including a weighted member pivotally mounted in said casing, and means adjustably positioned in and carried by said casing adapted to engage and raise said weighted member to a predetermined position upon rotation of said casing.

9. In a timing device for parking meters and the like, a casing mounted for rotation, an escapement mechanism within said casing, an indicator controlled by said escapement mechanism, means for driving said indicator and escapement mechanism, said driving means including a weighted member pivotally mounted in said casing, means adjustable for determining the length of a normal timing operation, and means actuatable at any time for rotating said casing to cause said adjustable means to engage and raise said weighted member to an initial position for initiation of a new timing operation.

CHARLES S. HAZARD.